United States Patent
Kim

(10) Patent No.: US 7,545,616 B2
(45) Date of Patent: Jun. 9, 2009

(54) CIRCUIT FOR DISCHARGING STATIC ELECTRICITY

(75) Inventor: Jang Hoo Kim, Kyoungki-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 34 days.

(21) Appl. No.: 11/771,500

(22) Filed: Jun. 29, 2007

(65) Prior Publication Data

US 2008/0123231 A1 May 29, 2008

(30) Foreign Application Priority Data

Jun. 30, 2006 (KR) .................... 10-2006-0061587

(51) Int. Cl.
*H02H 9/00* (2006.01)
*H02H 1/00* (2006.01)
(52) U.S. Cl. ............................................. 361/56
(58) Field of Classification Search ................. 361/56
See application file for complete search history.

(56) References Cited

U.S. PATENT DOCUMENTS 5,946,175 A * 8/1999 Yu ............................... 361/56
6,678,133 B2 * 1/2004 Roohparvar ................ 361/56
6,738,248 B1 * 5/2004 Jenkins et al. .............. 361/111
2002/0126430 A1 9/2002 Roohparvar

FOREIGN PATENT DOCUMENTS

JP 2001-267496 9/2001

OTHER PUBLICATIONS

Notice of Patent Grant mailed Jan. 8, 2008 for the corresponding KR10-2006-0061587.

* cited by examiner

*Primary Examiner*—Ronald W Leja
(74) *Attorney, Agent, or Firm*—Ladas & Parry LLP

(57) ABSTRACT

The present invention relates to a semiconductor circuit, and more particularly, to a circuit for discharging static electricity, which is connected between an internal circuit and an input/output pad to provide a charge device model (CDM) discharging path. The circuit includes a plurality of input/output pads; a plurality of switching units corresponding one-to-one to the input/output pads and turned on in a low voltage state; resistors connected between the input/output pads and the switching units so as to correspond one-to-one to the input/output pads and the switching units; and a CDM discharge unit shared in serial by the plurality of the switching units and providing a ground path.

7 Claims, 2 Drawing Sheets

CIRCUIT FOR DISCHARGING STATIC ELECTRICITY

CROSS-REFERENCE TO RELATED APPLICATIONS

The present application claims priority to Korean patent application number 10-2006-0061587 filed on Jun. 30, 2006, which is incorporated herein by reference in its entirety.

BACKGROUND OF THE INVENTION

The present invention relates to a semiconductor circuit, and more particularly, to a circuit for discharging static electricity, which is connected between an internal circuit and an input/output pad to provide a charge device model (CDM) discharging path.

Generally, electrostatic discharge (ESD) is a rapid flow of electric current when two mutually insulated objects with significantly different potentials come into direct contact with each other and an electrostatic discharging circuit is formed between an internal circuit of a semiconductor chip and a pad to be connected with input/output pins for preventing destruction or degradation of a product due to static electricity when designing a semiconductor device.

When a high voltage ESD current is introduced to an internal circuit of a semiconductor device with a designed power voltage of lower than 5V, circuit devices may be critically damaged. Therefore, it is necessary to provide a path through which the ESD current flows without destructing an internal circuit of the semiconductor device and the path through which the ESD current flows should be capable of discharging the static electricity efficiently within a short time.

Meanwhile, in semiconductor devices, ESD phenomenon is tested largely with a human body model (HBM), a machine model (MM) and a charge device model (CDM).

The HMB is for modeling a phenomenon that static electricity resulted from a human body is instantly discharged through the semiconductor device, the MM is for modeling a phenomenon that static electricity resulted from a machine is instantly discharged through the semiconductor device and the CDM is for modeling a phenomenon that static electricity accumulated in a device is instantly discharged to the outside when fabricating a semiconductor package.

Particularly, CDM charge has a direct influence on a product yield because an electric charge in a semiconductor device is discharged to the outside of the semiconductor device to destruct the semiconductor device in a fabrication process.

Therefore, semiconductor devices are provided with a circuit for discharging static electricity as shown in FIG. 1 or FIG. 2 in order to protect the semiconductor device from such CDM charge.

FIG. 1 shows a case that each internal circuit 20, 21 is connected with different input/output pads 10, 11. Independent electrostatic discharge circuits 30 and 31 are connected between respective internal circuits 20, 21 and respective input/output pads 10, 11.

Herein, the electrostatic discharge circuit 30 is a CDM electrostatic discharge circuit and this is for preventing damage when charges have been accumulated in the ground of a semiconductor device, electrostatic current is discharged through the internal circuit 20 to the input/output pad 10 to destruct the internal circuit 20 as a low potential is connected to the input/output pad 10.

The electrostatic discharge circuit 30 consists of Gate Ground NMOS (GGNMOS) transistor N1 connected with the ground at a gate and a source, and a resistor R1. Therefore, accumulated charges are discharged directly from the ground in the semiconductor device through the GGNMOS transistor N1 to the input/output pad 10, thereby protecting the internal circuit 20 from the electrostatic current.

Likewise, the electrostatic discharge circuit 31 consists of GGNMOS transistor N2 and a resistor R2, and electrostatic current is discharged directly from the ground in the semiconductor device through the GGNMOS transistor N2 to the input/output pad 11, thereby protecting the internal circuit 21 from the electrostatic current.

Meanwhile, FIG. 2 shows that each internal circuit 60, 61 is connected with the same input/output pad 50. Like in FIG. 1, independent electrostatic discharge circuits 70 and 71, which correspond to respective internal circuits 60 and 61, are connected between respective internal circuits 60 and 61 and the input/output pad 50, and electrostatic current is discharged directly from the ground in the semiconductor device through the electrostatic discharge circuits 70 and 71 to the input/output pad 50, thereby protecting the internal circuits 60 and 61 from the electrostatic current.

However, in the cases as shown in FIGS. 1 and 2, since independent electrostatic circuits are provided to the respective internal circuits, an area in the semiconductor which is occupied by the electrostatic circuit is increased. Further, a pin capacitance is increased due to a structure in which a transistor and a resistor are connected in parallel between an internal circuit and an input/output pad. Consequently, there is a problem that it is difficult to realize a small sized and high speed semiconductor device.

SUMMARY OF THE INVENTION

The present invention provides a device for discharging static electricity, which decreases an area of the electrostatic discharge circuit in a semiconductor device and reduces a pin capacitance.

The present invention provides a circuit for discharging static electricity, comprising a plurality of input/output pads; a plurality of switching units corresponding one-to-one to the input/output pads and turned on in a low voltage state; resistors connected between the input/output pads and the switching units so as to correspond one-to-one to the input/output pads and the switching units; and a CDM discharge unit shared in serial by the plurality of the switching units and providing a ground path.

The switching part of the present invention includes a PMOS transistor connected to an external power voltage at a gate thereof and turned on at lower than the external power voltage to form the ground path and a NMOS transistor connected with the PMOS transistor in parallel, connected to the input/output pad at a gate thereof and turned on at low voltage to form the ground path.

In addition, the discharge unit is preferably a GGNMOS transistor connected to the respective switching units at a drain thereof and to the ground at a gate and a source thereof.

In addition, a distance between the discharge unit and the internal circuit connected to the discharge unit is preferably approximately 100 μm.

According to another embodiment of the present invention, there is provided circuit for discharging static electricity, comprising a plurality of internal circuits; a plurality of switching units corresponding one-to-one to the internal circuits and turned on in a low voltage state; a single resistor connected to the plurality of the switching units; a single input/output pad connected to the resistor; and a CDM discharge unit shared in serial by the plurality of the switching units and providing a ground path.

In the aforementioned embodiment of the present invention, the switching unit includes a PMOS transistor connected to an external power voltage at a gate thereof and turned on at lower than the external power voltage to form the ground path and a NMOS transistor connected with the PMOS transistor in parallel, connected to the input/output pad at a gate thereof and turned on at low voltage to form the ground path.

In addition, the discharge unit is a GGNMOS transistor connected to the respective switching units at a drain thereof and to the ground at a gate and a source thereof.

In addition, a distance between the discharge unit and the internal circuit connected to the discharge unit is preferably approximately 100 μm.

DESCRIPTION OF SPECIFIC EMBODIMENTS

Hereinafter, exemplary embodiments of the present invention will be described with reference to the accompanying drawings.

Figure 1:
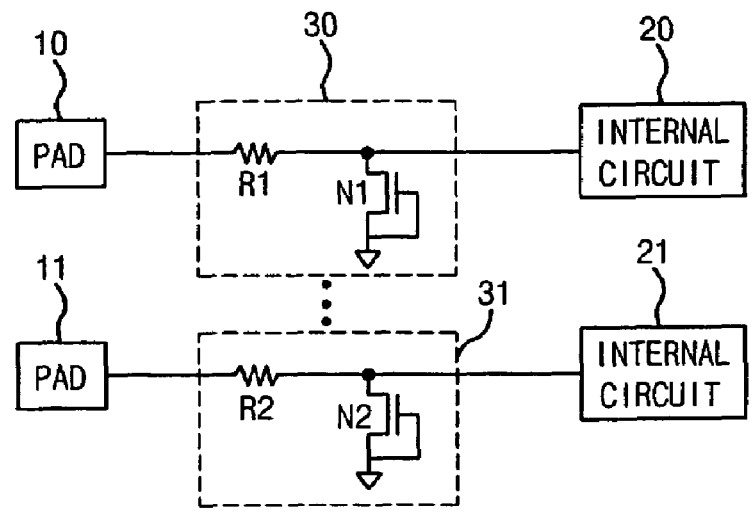
FIG. 1 is a circuit diagram of a conventional circuit for discharging static electricity.
Figure 2:
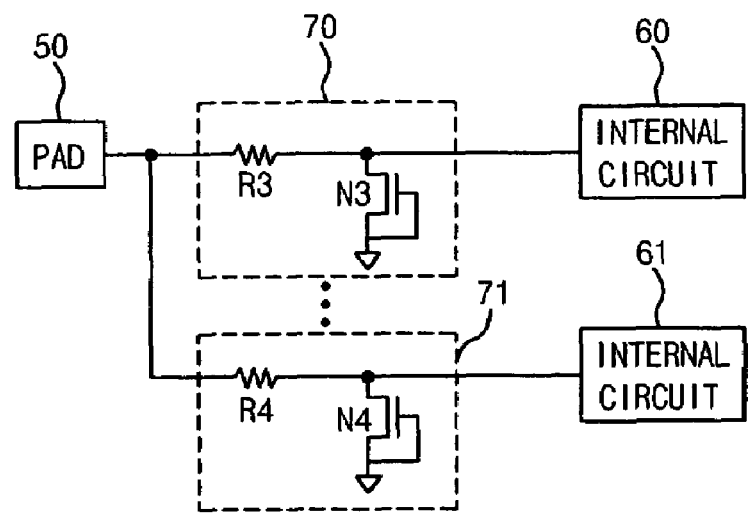
FIG. 2 is a circuit diagram of another conventional circuit for discharging static electricity.
Figure 3:
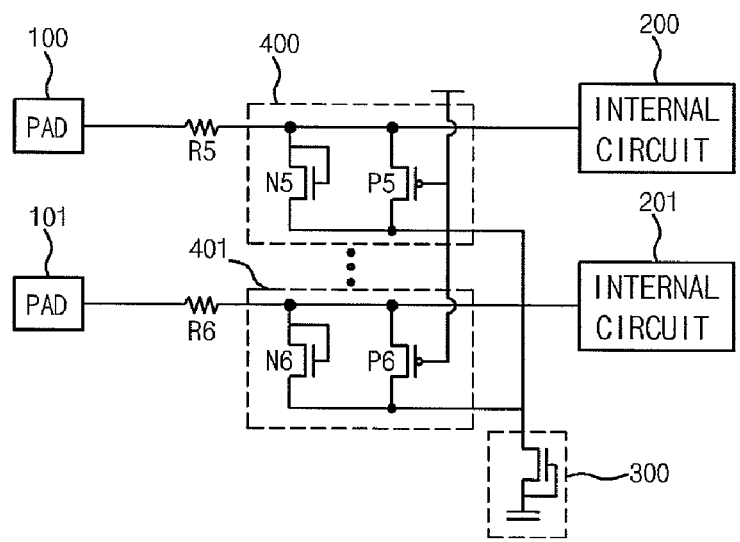
FIG. 3 is a circuit diagram of a circuit for discharging static electricity according to an embodiment of the present invention.

FIG. 3 is a circuit diagram of a circuit for discharging static electricity according to an embodiment of the present invention.

Referring to FIG. 3, in the circuit for discharging static electricity according to the present invention, respective internal circuits 200, 201 are connected with different input/output pads 100 and 101 and they share some part of the circuit for discharging static electricity with each other.

More specifically, a resistor R5 and a switching unit 400 are serially connected between the internal circuit 200 and the input/output pad 100, and a discharge unit 300 is serially connected with the switching unit 400. In addition, a resistor R6 and a switching unit 401 are serially connected between the internal circuit 201 and the input/output pad 101, and the discharge unit 300 is serially connected with the switching unit 401. In other words, the discharge unit 300 is commonly connected to the plurality of internal circuits 200 and 201 and thus be shared. At this time, a distance between the discharge unit 300 and the internal circuits 200, 201 is preferably approximate 100 μm.

Herein, the switching unit 400 is located at a front of the internal circuit 200, and includes a PMOS transistor P5 connected to an external power voltage (VDD) at a gate thereof and a NMOS transistor N5 connected in parallel with the PMOS transistor P5 and connected to the input/output pad 100 at a gate and a source thereof. These PMOS transistor P5 and NMOS transistor N5 are connected to the discharge unit 300 respectively. At this time, it is preferable to regulate a turn on voltage of the PMOS transistor PS to be lower than the external power voltage (VDD).

In addition, the resistor R5 is connected to the switching unit 400 at an end thereof and to the input/output pad 100 at the other end thereof.

Likewise, the switching unit 401 is located at a front of the internal circuit 201, and includes a PMOS transistor P6 connected to an external power voltage (VDD) at a gate thereof and a NMOS transistor N6 connected in parallel with the PMOS transistor P6 and connected to the input/output pad 101 at a gate and a source thereof. These PMOS transistor P6 and NMOS transistor N6 are connected to the discharge unit 300 respectively.

In addition, the resistor R6 is connected to the switching unit 401 at an end thereof and to the input/output pad 101 at the other end thereof.

The discharge unit 300 includes a GGNMOS transistor N7, in which a drain thereof is connected commonly with the switching units 400 and 401 connected between the input/output pad and the internal circuit respectively and a gate and source thereof are connected to a ground.

At this time, since a size of the transistor constructing the switching unit is minimally 10 percent of an area of the transistor in the discharge unit, an area occupied by the circuit for discharging static electricity is significantly decreased compared to the conventional case in which each internal circuit has an independent discharge unit transistor. In addition, since the discharge unit is serially connected with the switching unit, there is an effect of decreasing a pin capacitance.

In an operation of the first embodiment of FIG. 3, in a case of a test mode, PMOS transistors P5 and P6 are always turned on since the external power voltage (VDD) is not applied.

At this time, in a path through which charges accumulated in the ground of the semiconductor device flow to the respective input/output pads 100 and 101, for example, when a positive static electricity is generated, PMOS transistors P5 and P6 of the switching units 400 and 401 are turned on to form a path in which the charges flow out through the discharge unit 300. To the contrary, when a negative static electricity is generated, NMOS transistors N5 and N6 of the switching units 400 and 401 are turned on by NP diode operation to form a current path connected with the discharge unit 300 thereby protecting safely the internal circuits 100 and 101. As such, the discharge unit 300 is commonly used for protecting respective internal circuits 100 and 101.

Next, since the external power voltage is applied during normal working operations, the PMOS transistors P5 and P6 are in a turn off state. Further, NMOS transistors N5 and N6 form a reversely constructed NP diode and thus the input/output pads are electrically insulated with each other. Therefore, the discharge unit 300 has no influence during normal working operations.

Figure 4:
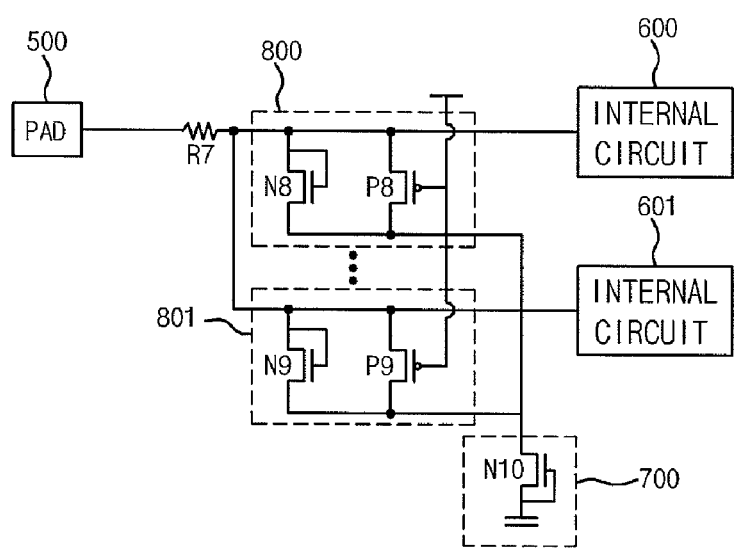
FIG. 4 is a circuit diagram of a circuit for discharging static electricity according to another embodiment of the present invention.

Meanwhile, the second embodiment of FIG. 4 shows a case that respective internal circuits 600 and 601 are connected to the same input/output pad 500 and the internal circuits 600 share entire circuit for discharging static electricity.

More specifically, a switching unit 800 is connected between the internal circuit 600 and the input/output pad 500 and a discharge unit 700 is serially connected with the switching unit 800. Further, a switching unit 801 is connected between the internal circuit 601 and the input/output pad 500 and the discharge unit 700 is also serially connected with the switching unit 801. As a result, the discharge unit 700 is commonly connected to the plurality of the internal circuits 600 and 601 and thus be shared.

In addition, a resistor R7 is connected between the input/output pad 500 and the respective switching units 800 and 801 to be shared by the switching units 800 and 801.

Herein, the switching unit 800 is the same as that of the first embodiment. In other words, the switching unit 800 is located at a front of the internal circuit 600, and includes a PMOS transistor P8 connected to an external power voltage (VDD) at a gate thereof and a NMOS transistor N8 connected in parallel with the PMOS transistor P8 and connected to the input/output pad 500 at a gate and a source thereof. These PMOS transistor P8 and NMOS transistor N8 are connected to the discharge unit 700 respectively.

Likewise, the switching unit 801 is located at a front of the internal circuit 601, and includes a PMOS transistor P9 connected to an external power voltage (VDD) at a gate thereof and a NMOS transistor N9 connected in parallel with the PMOS transistor P9 and connected to the input/output pad 500 at a gate and a source thereof. These PMOS transistor P9 and NMOS transistor N9 are connected to the discharge unit 700 respectively.

The discharge unit 700 includes a GGNMOS transistor N10, in which a drain thereof is connected commonly with the switching units 800 and 801 connected between the input/output pad and the internal circuit respectively and a gate and source thereof are connected to a ground.

In other words, since only the discharge unit of the resistor and the discharge unit constructing the circuit for discharging static electricity in the first embodiment whereas the resistor R5 as well as the discharge unit 700, both constructing the circuit for discharging static electricity, are shared in the second embodiment, an area of the GGNMOS transistor and an area of the resistor are decreased and thus there is an effect of more decreasing an area of the electrostatic discharging device in the semiconductor.

An operation of the second embodiment of FIG. 4 is the same as that of the first embodiment and thus an explanation will not be repeated.

As described above, since an electrostatic discharging circuit, including a resistor and GGNMOS transistor which are provided in respective internal circuits for protecting the internal circuits from CDM electrostatic current, is constructed to be used commonly by a plurality of the internal circuits through a switching unit. As a consequence, there is an effect of improving significantly an area of the electrostatic discharging circuit in a semiconductor device. In addition, since the switching unit and the GGNMOS transistor are serially connected with each other, there is an effect in decreasing a pin capacitance.

Therefore, according to the present invention, a plurality of internal circuits use commonly the electrostatic discharging circuit through a switching unit to decrease an area of the electrostatic discharging circuit in a semiconductor device. Thereby the present invention is capable of providing the circuit for discharging static electricity adapted to a high integration.

Further, according to the present invention, the switching unit is serially connected with the electrostatic discharging circuit. Thereby the present invention is capable of providing the circuit for discharging static electricity adapted to a high speed operation.

What is claimed is:

1. A circuit for discharging static electricity, comprising:
a plurality of input/output pads;
a plurality of switching units connected to the input/output pads, each switching unit connected to one corresponding input/output pad, wherein the switching units are configured to be turned on in response to a low voltage state relative to an external power voltage;
a plurality of resistors connected between the input/output pads and the switching units, each resistor connected to one corresponding input/output pad and to one corresponding switching unit; and
a charge device model (CDM) discharge unit serially connected to the plurality of the switching units, wherein the CDM discharge unit providing a part of a ground path,
wherein each switching unit includes:
a PMOS transistor having a gate connected to the external power voltage, configured to be turned on at a lower potential than the potential of the external power voltage, thereby forming part of the ground path; and
a NMOS transistor connected in parallel to the PMOS transistor, the NMOS transistor having a gate connected to one of the input/output pads, configured to be turned on at lower potential than the potential of the external power voltage, thereby forming part of the ground path.

2. The circuit according to claim 1, wherein the discharge unit is a gate around NMOS (GGNMOS) transistor having a drain, a gate and a source, the drain of the GGNMOS transistor connected to the respective switching units and the gate and the source of the GGNMOS transistor connected to ground.

3. The circuit according to claim 1, wherein a distance between the CDM discharge unit and an internal circuit connected to the discharge unit is at most approximately 100μm.

4. A circuit for discharging static electricity, comprising:
a plurality of internal circuits;
a plurality of switching units connected to the plurality of internal circuits, each switching unit connected to one corresponding internal circuit, wherein the switching units are configured to be turned on in response to a low voltage state relative to an external power voltage;
a single resistor connected to the plurality of the switching units;
a single input/output pad connected to the resistor; and
a charge device model (CDM) discharge unit serially connected to the plurality of the switching units, wherein the CDM discharge unit providing a part of a ground path.

5. The circuit according to claim 4, wherein each switching unit includes:
a PMOS transistor having a gate connected to the external power voltage wherein the PMOS transistor configured to be turned on at a lower voltage relative to the external power voltage, wherein the turned on PMOS transistor forms cart of the ground path; and
a NMOS transistor connected in parallel to the PMOS transistor, the NMOS transistor having a date connected to the input/output pad and the NMOS transistor configured to be turned on at lower voltage relative to the external power voltage wherein the turned on NMOS transistor forms part of the ground path.

6. The circuit according to claim 4, wherein the CDM discharge unit is a gate ground NMOS (GGNMOS) transistor having a drain, a gate and a source, the drain of the GGNMOS transistor connected to the respective switching units and the gate and the source of the GGNMOS connected to ground.

7. The circuit according to claim 4, wherein a distance between the discharge unit and the internal circuit connected to the discharge unit is at most approximately 100 μm.

* * * * *